United States Patent
Delaney et al.

(10) Patent No.: US 7,760,706 B2
(45) Date of Patent: Jul. 20, 2010

(54) METHODS AND SYSTEMS FOR MESSAGE TRANSFER PART (MTP) LOAD SHARING USING MTP LOAD SHARING GROUPS

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 1414 days.

(21) Appl. No.: 10/993,738

(22) Filed: Nov. 19, 2004

(65) Prior Publication Data

US 2005/0111442 A1    May 26, 2005

Related U.S. Application Data

(60) Provisional application No. 60/523,817, filed on Nov. 20, 2003.

(51) Int. Cl.
*H04L 12/66* (2006.01)
*H04J 3/12* (2006.01)
*H04M 7/06* (2006.01)

(52) U.S. Cl. .................. 370/352; 370/236; 370/389; 370/467; 370/469; 370/524; 370/338; 370/395.52; 370/356; 370/385; 370/402; 379/229; 379/230

(58) Field of Classification Search ......... 370/236–524; 379/219, 221, 229–23
See application file for complete search history.

(56) References Cited

U.S. PATENT DOCUMENTS

| | | | |
|---|---|---|---|
| 5,926,482 A * | 7/1999 | Christie et al. ............. 370/469 |
| 6,108,409 A | 8/2000 | Cooper et al. | |
| 6,282,280 B1 | 8/2001 | Rekieta et al. | |
| 6,327,472 B1 | 12/2001 | Westroos et al. | |
| 6,515,985 B2 | 2/2003 | Shmulevich et al. | |

(Continued)

FOREIGN PATENT DOCUMENTS

JP     05037596 A  *  2/1993

(Continued)

OTHER PUBLICATIONS

Notification of Transmittal of the International Search Report and the Written Opinion of the International Searching Authority, or the Declaration for International Application No. PCT/US04/38827 (Jul. 11, 2006).

(Continued)

*Primary Examiner*—Ayaz R Sheikh
*Assistant Examiner*—Venkatesh Haliyur
(74) *Attorney, Agent, or Firm*—Jenkins, Wilson, Taylor & Hunt, P.A.

(57) ABSTRACT

Methods and systems for load sharing signaling messages at the MTP level are disclosed. When a signaling message is received, it is determined whether the signaling message includes a routing indication indicating route-on-point-code-subsystem-number. If the routing indicator indicates route-on-point-code-subsystem-number, it is determined whether the signaling message belongs to an MTP level 3 load sharing group. If the signaling message belongs to an MTP level 3 load sharing group, the signaling message may be routed to any of the point codes in the MTP level 3 load sharing group. Routing the signaling message to a point code in the MTP level 3 load sharing group may include replacing the destination point code in the signaling message with the destination point code of the node to which the signaling message is to be routed. Once the point code has been replaced, the signaling message is routed to the destination associated with the point code.

30 Claims, 5 Drawing Sheets

U.S. PATENT DOCUMENTS

| | | | |
|---|---|---|---|
| 6,628,672 B1 * | 9/2003 | Cabello | 370/474 |
| 6,647,113 B2 | 11/2003 | McCann et al. | |
| 6,662,017 B2 * | 12/2003 | McCann et al. | 455/461 |
| 6,678,369 B2 * | 1/2004 | DeMent et al. | 379/221.03 |
| 6,760,343 B1 * | 7/2004 | Krishnamurthy et al. | 370/466 |
| 6,785,378 B2 | 8/2004 | Mar | |
| 6,788,774 B1 * | 9/2004 | Caldwell et al. | 379/201.03 |
| 6,826,198 B2 | 11/2004 | Turina et al. | |
| 6,901,262 B2 * | 5/2005 | Allison et al. | 455/456.1 |
| 7,023,794 B2 | 4/2006 | Khan et al. | |
| 7,050,562 B2 * | 5/2006 | Allison et al. | 379/221.01 |
| 7,068,773 B2 | 6/2006 | McCann et al. | |
| 7,092,388 B2 * | 8/2006 | Jarlstedt | 370/384 |
| 7,092,505 B2 * | 8/2006 | Allison et al. | 379/229 |
| 7,127,057 B2 * | 10/2006 | Delaney et al. | 379/221.13 |
| 7,136,477 B2 * | 11/2006 | Craig et al. | 379/230 |
| 7,197,036 B2 * | 3/2007 | Craig | 370/392 |
| 7,222,192 B2 * | 5/2007 | Allison et al. | 709/245 |
| 7,257,215 B2 * | 8/2007 | Angermayr et al. | 379/221.08 |
| 7,260,086 B2 * | 8/2007 | Delaney et al. | 370/352 |
| 7,286,524 B1 * | 10/2007 | Loftus | 370/354 |
| 7,372,953 B2 * | 5/2008 | Delaney et al. | 379/221.08 |
| 7,440,472 B2 * | 10/2008 | Delaney et al. | 370/466 |
| 7,522,580 B2 * | 4/2009 | Miller et al. | 370/352 |
| 7,532,647 B2 * | 5/2009 | Eichler et al. | 370/524 |
| 7,554,974 B2 * | 6/2009 | Palmer et al. | 370/359 |
| 7,564,870 B2 * | 7/2009 | Miller et al. | 370/467 |
| 7,633,969 B2 | 12/2009 | Caugherty et al. | |
| 2001/0029182 A1 * | 10/2001 | McCann et al. | 455/433 |
| 2001/0055380 A1 | 12/2001 | Benedyk et al. | |
| 2002/0116522 A1 | 8/2002 | Zelig | |
| 2002/0176430 A1 | 11/2002 | Sangha et al. | |
| 2002/0186702 A1 | 12/2002 | Ramos et al. | |
| 2003/0061234 A1 * | 3/2003 | Ali et al. | 707/104.1 |
| 2003/0108067 A1 * | 6/2003 | Craig et al. | 370/522 |
| 2003/0169779 A1 * | 9/2003 | Craig | 370/522 |
| 2004/0081206 A1 * | 4/2004 | Allison et al. | 370/522 |
| 2004/0203849 A1 * | 10/2004 | Allison et al. | 455/456.1 |
| 2004/0240658 A1 * | 12/2004 | Delaney et al. | 379/229 |
| 2004/0264675 A1 * | 12/2004 | Delaney et al. | 379/229 |
| 2005/0013290 A1 * | 1/2005 | Allison et al. | 370/352 |
| 2005/0047401 A1 * | 3/2005 | Garnero et al. | 370/353 |
| 2005/0120095 A1 | 6/2005 | Aman et al. | |
| 2006/0013264 A1 | 1/2006 | Eichler et al. | |
| 2006/0067503 A1 | 3/2006 | Caugherty et al. | |
| 2008/0013446 A1 * | 1/2008 | Xu et al. | 370/217 |

FOREIGN PATENT DOCUMENTS

| | | |
|---|---|---|
| WO | WO 00/60812 | 10/2000 |
| WO | WO 2005052743 A2 * | 6/2005 |
| WO | WO 2008/105976 | 9/2008 |

OTHER PUBLICATIONS

Supplementary European Search Report for European Patent Application No. 04811530.7—1249 (Apr. 15, 2008).

Jabbari, "Routing and Congestion Control in Common Channel Signaling System No. 7," Proceedings of the IEEE, vol. 80, No. 4, pp. 607-617 (Apr. 1992).

Official Action for U.S. Appl. No. 11/147,144 (Nov. 13, 2008).

Notification of Transmittal of the International Search Report and the Written Opinion of the International Searching Authority, or the Declaration for International Application No. PCT/US05/32070 (Jul. 11, 2008).

Notice of Allowance and Fee(s) Due for U.S. Appl. No. 11/147,144 (Aug. 17, 2009).

Official Action for U.S. Appl. No. 11/147,144 (Jul. 7, 2009).

Supplemental Notice of Allowability for U.S. Appl. No. 11/147,144 (Nov. 17, 2009).

Sidebottom et al., "Signaling System 7 (SS7) Message Transfer Part 3 (MTP3)—User Adaptation Layer (M3UA)," RFC 3332, pp. 1-113 (Sep. 2002).

* cited by examiner

METHODS AND SYSTEMS FOR MESSAGE TRANSFER PART (MTP) LOAD SHARING USING MTP LOAD SHARING GROUPS

RELATED APPLICATIONS

This application claims the benefit of U.S. Provisional Patent Application Ser. No. 60/523,817, filed Nov. 20, 2003, the disclosure of which is incorporated herein by reference in its entirety.

TECHNICAL FIELD

The subject matter described herein relates to methods and systems for load sharing signaling messages. More particularly, the subject matter described herein relates to methods and systems for MTP load sharing signaling messages among point codes in MTP load sharing groups.

BACKGROUND ART

In order to route signaling system 7 (SS7) messages, network elements within an SS7 network must be configured with a routable network identity or address (e.g., a point code address) and routing or path information associated with other network elements witnin the network. One aspect of message routing in an SS7 network that is of particular interest with respect to the subject matter described herein involves the load sharing of signaling messages among multiple network elements when signaling messages are sent route-on-point-code-subsystem-number. In conventional SS7 networks, the ability to load-share signaling messages between different groups of network elements is reserved for global-title-routed messages that are destined for mated network elements hosting mated subsystems. One type of signaling messages sent to network elements hosting mated application subsystems includes signaling connection control part (SCCP) messages. In one routing scenario, a signal transfer point (STP) may load share received messages between network elements that are assigned a particular subsystem. This allows stateless and stateful applications to process traffic between two or more mated nodes in the most efficient and reliable manner in the SS7 network. Typically, configuration of a mated subsystem table and global title translation (GTT) operations are required to facilitate this load sharing relationship between an STP and, for example, a service control point (SCP), or any other network element that hosts an application for which load sharing is desired.

One problem associated with the above-described load sharing techniques is illustrated in FIG. 1. In FIG. 1, a first network 100 includes a service switching point (SSP) 102 and a signal transfer point 104. A second network 106 includes a signal transfer point 107 and service control points 108 and 110. When originating SSP 102 attempts to send a message to one of service control points 108 and 110 in network 106, originating service switching point 102 sends the message route-on-global-title to STP 104. STP 104 performs a global title translation, changes the routing indicator to route-on-point-code-subsystem-number (route-on-PC-SSN) and forwards the message to network 106. STP 107 and network 106 receives the message and routes the message based on point code and SSN to the appropriate SCP.

Because network 106 receives the message with the routing indicator marked route-on-point-code-SSN, there is no ability in network 106 to load share such messages among destinations, such as SCP 108 and SCP 110 when messages are sent route-on-PC-SSN. The inability to load share messages sent route-on-PC-SSN can be a significant disadvantage for terminating network operators because the ability of these operators to deploy identically provisioned nodes and load share messages between these nodes is limited.

In light of the inability to perform load sharing based on messages that are sent route-on-PC-SSN, there exists a need for improved methods and systems for load sharing signaling messages that are sent route-on-PC-SSN.

DISCLOSURE OF THE INVENTION

The subject matter described herein includes methods and systems for load sharing signaling message traffic among signaling nodes in an MTP load sharing group. According to one method, a signaling message that is marked route-on-PC-SSN is received, and an MTP load sharing group is identified for the signaling message. The signaling message may then be load shared among destination nodes in the MTP load sharing group. Load sharing the signaling message among nodes in the MTP load sharing group may include replacing the destination point code in a message with an alternate destination point code. The ability to identify MTP load sharing groups for messages marked route-on-PC-SSN and replace destination point codes allows load sharing to be performed at the MTP level without requiring global title translation to be implemented.

As used herein, the term "MTP load sharing group" refers to a group of point codes among which MTP-routed messages may be load shared using a load sharing algorithm. Exemplary load sharing algorithms suitable for use with implementations of the subject matter described herein include round robin load sharing algorithms, weighted round robin load sharing algorithms, or any other suitable load sharing algorithm.

The methods and systems described herein can be implemented in hardware, software, firmware, or any combination thereof. In one exemplary implementation, a method for MTP load sharing may be implemented in a computer program product comprising computer-executable instructions embodied in a computer-readable medium. Exemplary computer-readable media suitable for implementing the subject matter described herein includes optical, magnetic, and electrical memory storage devices.

Accordingly, it is an object of the subject matter described herein to provide methods and systems for load sharing signaling messages that are received with routing indicators marked route-on-PC-SSN.

It is another object of the subject matter described herein to provide methods and systems for load sharing MTP-routed signaling messages among point codes in an MTP load sharing group.

Some of the objects of the described herein having been stated hereinabove, and which are addressed in whole or in part by the subject matter described herein, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings of which.

DETAILED DESCRIPTION OF THE INVENTION

Embodiment 1

MTP Load Sharing Among Nodes in MTP Load Sharing Groups

In a first embodiment, message transfer part (MTP) load sharing is facilitated between a designated group of point code addresses. With this embodiment, a network operator may configure a group of point codes to be considered an MTP load sharing group, (MLG). The group members may be assigned relative weights, which may determine their hierarchical status within the group.

Figure 1:
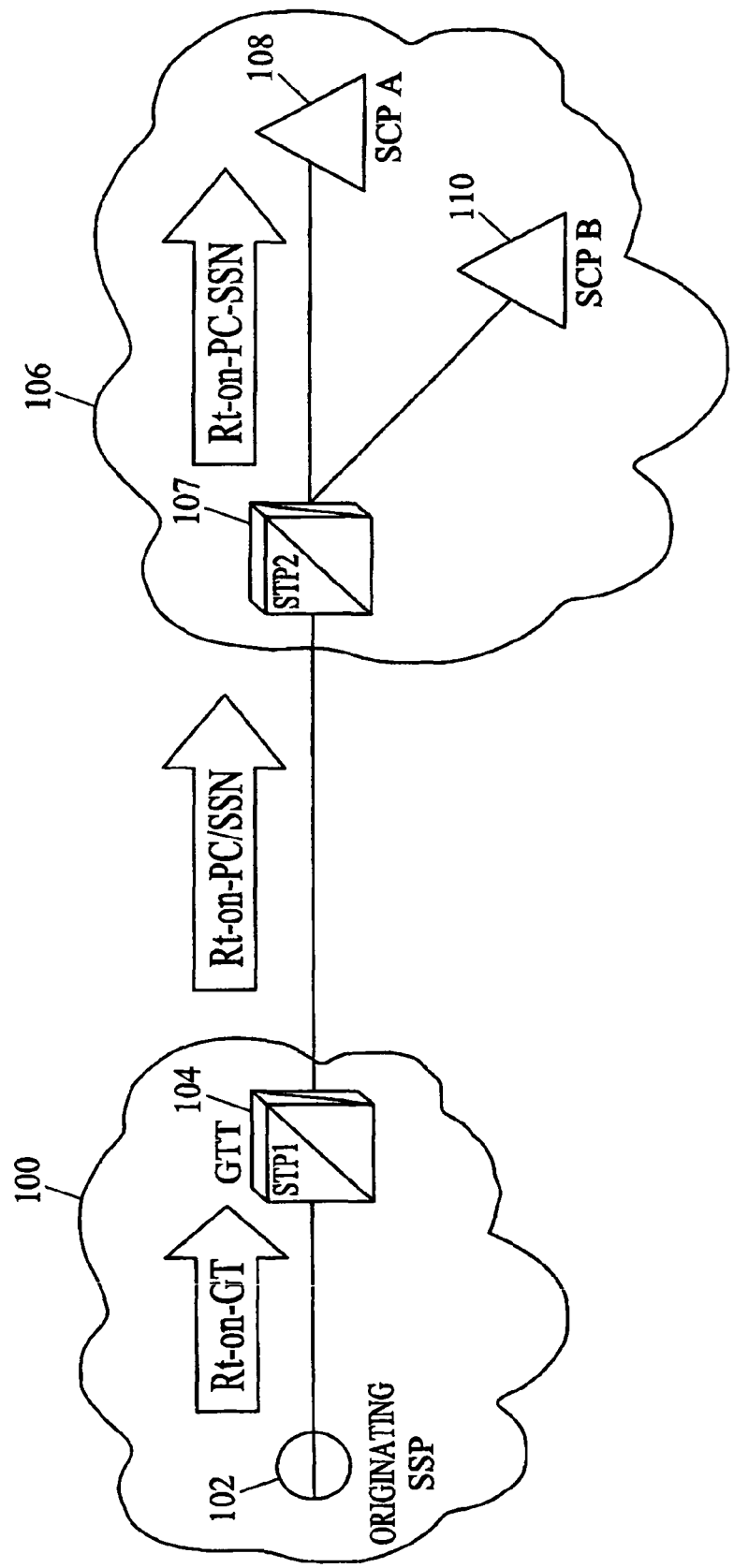
FIG. 1 is a network diagram illustrating conventional MTP routing after global title translation has been performed.
Figure 2:
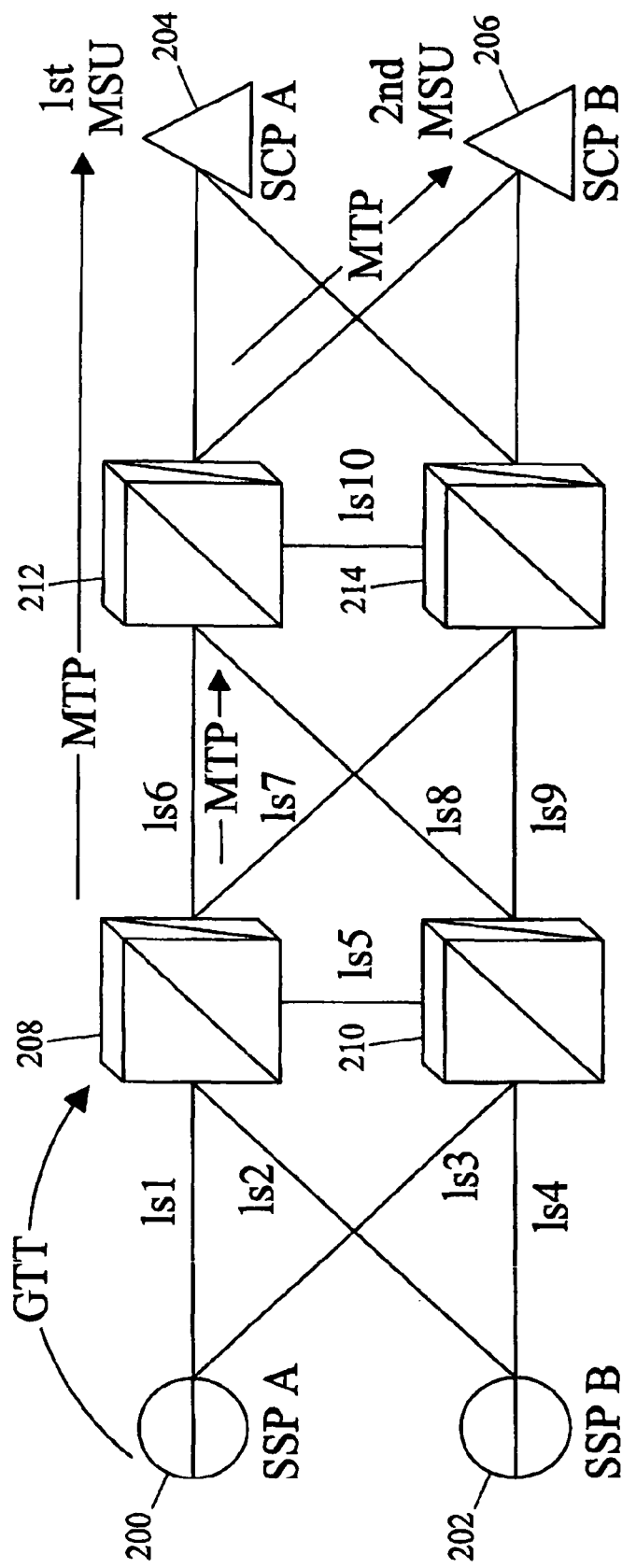
FIG. 2 is a network diagram illustrating MTP load sharing among nodes in MTP load sharing groups according to an embodiment of the subject matter described herein.

FIG. 2 is a network diagram illustrating load sharing among MTP load sharing groups according to an embodiment of the subject matter described herein. Referring to FIG. 2, SSPs 200 and 202 send messages to SCPs 204 and 206. The messages are initially sent route-on-global-title to either STP 208 or STP 210. STP 208 or STP 210 performs global title translation on the messages and changes the routing indicator in the messages to indicate that the messages are route-on-PC-SSN. STPs 212 and 214 receive messages destined to the point code of one of SCPs 204 and 206. Rather than simply routing these messages, STPs 212 and 214 identify messages as being members of an MTP load sharing group and load share the messages according to relative weights assigned to members of the group. Table 1 shown below illustrates an exemplary MTP load sharing group table that may be provisioned in STPs 212 or 214 according to an embodiment of the subject matter described herein.

TABLE 1

MTP Load Sharing Groups

| Group ID | Point Code | Relative Cost | SI | OPC |
|---|---|---|---|---|
| 1 | SCP C | 10 | 5, 3, 2, 1 | SSP A |
| 1 | SCP D | 10 | 5, 3, 2, 1 | SSP A |
| 2 | SCP E | 10 | 3 | SSP B |
| 2 | SCP F | 10 | 3 | SSP B |
| 2 | SCP G | 20 | 3 | SSP B |
| 3 | SCP H | 10 | 3 | *(wild card) |
| 3 | SCP I | 20 | 3 | *(wild card) |

In Table 1, the first two entries define an MTP load sharing group for messages sent from SSP A 200 to SCP C 204 or SCP D 206. If a message is received at STP 212 with OPC=SSP A and DPC=SCP C 204 or SCP D 206, the message will be assigned to MTP load sharing group 1. For messages assigned to MTP load sharing group 1, load sharing is performed equally between SCP C 204 and SCP D 206, because SCP C 204 and SCP D 206 are assigned equal weights. However, the subject matter described herein is not limited to assigning the same weights to members of an MTP load sharing group. In an alternate implementation, different weights may be assigned to members of an MTP load sharing group, for example, based on processing capacities of members of the load sharing group. For example, if SCP C 204 has twice the processing capacity of SCP D 206, the weight assigned to SCP C 204 may be twice that assigned to SCP D 206. Assigning weights to members of an MTP load sharing group based on any operator-configurable criteria is intended to be within the scope of the subject matter described herein.

In one example using the weights illustrated in Table 1, the first message received that is addressed to the point code of SCP C 204 may be sent to SCP C 204. The second message received for SCP C 204 may be sent to SCP D 206. The routing function may employ counters or other mechanism for keeping track of the number of messages sent to members of the group so that messages can be sent to group members in proportion to the relative weights assigned to each group member. The OPC field in Table 1 is optional and may be omitted without departing from the scope of the subject matter described herein.

In one embodiment, an MTP load sharing group table may be accessible by a routing function associated with a network routing node, such as an STP or an Internet protocol-capable signaling gateway (SG) routing node. An SG routing node may support the routing of SS7-over-MTP signaling messages, SS7-over-IP (e.g., Internet Engineering Task Force SIGTRAN protocols, M3UA, M2UA, SUA, etc.), session initiation protocol (SIP), and other signaling protocol messages. The load sharing group table may be associated with a signaling link interface module or a database services module of an STP or SG routing node.

Figure 3:
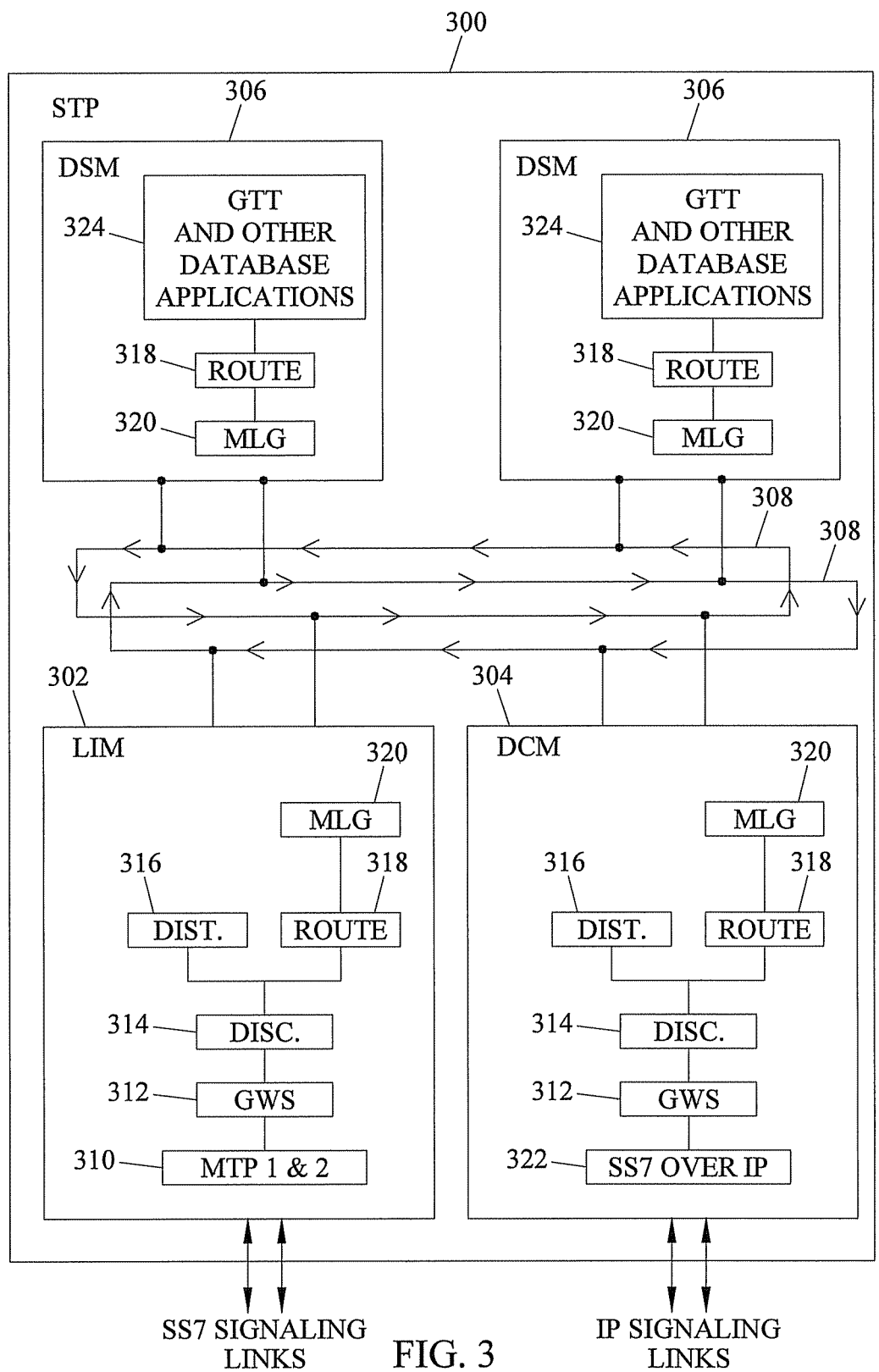
FIG. 3 is a block diagram of a signal transfer point include an MTP load sharing group table according to an embodiment of the subject matter described herein.

FIG. 3 is a block diagram of a signal transfer point including MTP load sharing capabilities according to an embodiment of the subject matter described herein. Referring to FIG. 3, signal transfer point 300 includes a link interface module 302, a data communications module 304, and database services modules 306. Each module 302, 304, and 306 includes a printed circuit board, an application processor, and a communications processor. The application processor on each module performs signaling message processing functions. The communications processor on each module communicates with other communications modules via buses 308.

Link interface module 302 includes MTP level 1 and 2 function 310, gateway screening function 312, discrimination function 314, distribution function 316, routing function 318, and MTP load sharing groups table 320. MTP level 1 and 2 function 310 performs physical level functions for sending and receiving data over a physical medium, error correction, error detection, and sequencing of signaling messages. Gateway screening function 312 screens signaling messages to determine whether or not to allow the messages into the network. Discrimination function 314 determines whether received messages are addressed to STP 300 or whether the messages are to be through switched.

For messages that are addressed to STP 300, discrimination function 314 forwards these messages to distribution function 316. Distribution function 316 distributes these messages to the appropriate internal processing module, such as one of the DSMs 306, for internal processing. For messages that are to be through switched, i.e., messages that are marked route-on-PC-SSN and that are addressed to a point code other than the point code of STP 300, discrimination function 314 forwards these messages to routing function 318. According to the subject matter described herein, routing function 318 determines whether received messages are addressed to MTP load sharing groups based on data in MTP load sharing group table 320. For messages that are addressed to MTP load sharing groups, routing function 318 selects a destination point code within the load sharing group and routes the messages to the outbound signaling link associated with the destination point code. As a result, routing function 318 and MTP load sharing group table 320 allow load sharing to be performed at the MTP level without requiring that messages be sent route-on-global-title.

DCM 304 includes similar SS7 functionality to LIM 302. In addition, DCM 304 includes SS7-over-IP layers 322 for sending and receiving SS7 messages over IP signaling links. SS7-over-IP-layers 322 may include a physical layer, a network layer, a transport layer, and a signaling message adaptation layer. An exemplary physical layer that may be implemented includes ATM or Ethernet. An exemplary network layer that may be implemented includes IP. An exemplary transport layer that may be implemented may include TCP, UDP, or SCTP. An exemplary signaling message adaptation layer that may be implemented may include M2PA, M3UA, SUA, or TALI. For SS7 messages received over IP signaling links, SS7-over-IP layers 322 remove the IP layers and forward the SS7 messages to components 312-320. DCM 304 processes these messages in the same manner as LIM 302. For example, for messages with routing indicators marked route-on-PC-SSN that are addressed to a point code other than that of STP 300, the routing function on DCM 304 may determine whether the messages are addressed to an MTP load sharing group. If a message is determined to be addressed to an MTP load sharing group, the routing function associated with DCM 304 will load share the message to one of the point codes in the MTP load sharing groups using data stored in the MTP load sharing table resident on DCM 304. Accordingly, STP 300 is capable of performing load sharing for MTP-routed messages that are originally sent over IP signaling links.

DSMs 306 include GTT and other database applications 324 for performing global title translation and number portability translations for received signaling messages. DSMs 306 also include routing function 318 and MTP load sharing group tables 320 for load sharing messages at the MTP level after translations are performed for received signaling messages. Routing functions 318 and MTP load sharing group functions 320 operate similarly to the corresponding components of LIM 302. Hence, a description thereof will not be repeated herein.

Although typically an SI=3 (SCCP) would be used along with the DPC to identify messages addressed to load sharing groups, the subject matter described herein is not limited to load sharing SCCP messages. For example, load sharing may be performed for other types of messages without departing from the scope of the subject matter described herein. In order to load-share other types of messages, the data illustrated in Table 1 may be modified to include the appropriate load sharing parameters. For example, in the case of Internet protocol (IP)-based network elements, the Point Code and OPC fields in Table 1 may be modified to include appropriate source and destination identifiers. For example, for SS7 over IP signaling messages and IP telephony signaling messages, source and destination IP addresses may be used. In the example provided by Table 1 an MSU that is MTP routed to the destination SCP C will be load shared between all point codes that share the same group ID as SCP C as long as the message meets the discrimination entered for the group ID, such as SI and OPC.

Figure 4:
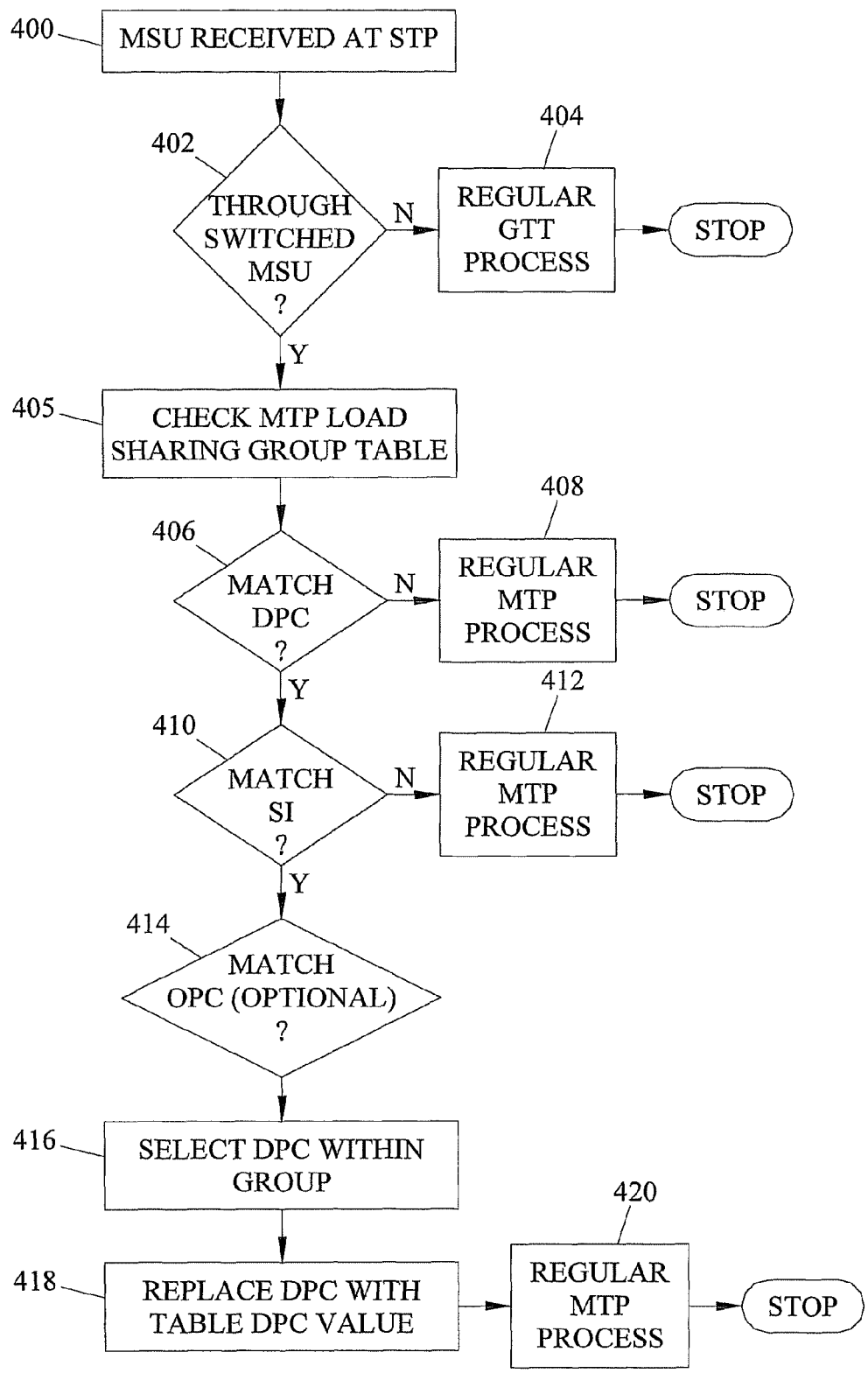
FIG. 4 is a flow chart illustrating exemplary message processing steps for MTP load sharing among nodes in MTP load sharing groups according to an embodiment of the subject matter described herein.

FIG. 4 is a flow chart illustrating exemplary MTP load share message handling or processing that may be implemented at a network node, such as an STP. Referring to FIG. 4, in step 400, an MSU is received at an STP. In step 402, it is determined whether the MSU is to be through switched. Determining whether the message is to be through switched may include analyzing the routing indicator and the DPC in the signaling message. If the routing indicator is set to route-on-PC-SSN and the DPC is set to a value other than a point code of the receiving STP, then the message may be identified as through-switched message. The determination of whether a message is to be through-switched may be performed by discrimination function 314 illustrated in FIG. 3.

If the message is not to be through switched, in step 404, the message is sent to GTT or other internal function for further processing. It should be noted that MTP load sharing can be performed after GTT, in the manner described above with regard to FIG. 3.

In step 405, if the message is to be through switched, the MTP load sharing group table is checked to determine whether the DPC in the message is associated with an MTP load sharing group. In step 406, if the DPC does not match one of the groups, control proceeds to step 408 where normal MTP routing is performed. In step 410, further discrimination is performed based on the service indicator in the message. If the service indicator does not match one of the service indicators for the matching DPC, control proceeds to step 412 where normal MTP routing is performed.

If the service indicator and the DPC match one of the groups, control proceeds to step 414 where the OPC in the message is compared to the OPC associated with the group. Step 414 is optional and can be omitted without departing from the scope of the subject matter described herein. If the OPC matches, control proceeds to step 416 where the routing function selects a DPC within the group. In step 418, if the selected DPC is different from the DPC in the original received signaling message, in step 418, DPC in the message is replaced with the table DPC value. In step 420, the message is routed to its intended destination.

According to another aspect of the subject matter described herein, SS7 network management procedures may be implemented in an STP that includes MTP load sharing functionality. Messages sent to an MTP load sharing group may be routed to either a capability point code (CPC) for MTP routing or the actual destination point code. A capability point code or CPC is a point code shared by two or more identically provisioned nodes. Each node may also have its own true point code. In either case the STP may maintain network status of the "group" and issue appropriate network management functions.

Option 1

In one exemplary implementation, the STP may maintain a CPC for MTP routing and correlate appropriate destinations to that CPC. Far end nodes (i.e., nodes that send messages to MTP load sharing groups) preferably do not route to the actual point code of the destination but rather to the CPC. This would allow the operator to mask the true point codes from the far end nodes. The receiving STP may load share messages addressed to the same CPC or group ID. Table 2 shown below illustrates a modification of the group code table to include a CPC for each group.

TABLE 2

MTP Load Sharing Groups and Corresponding CPCs

| CPC | Group ID | Point Code | Relative Cost | SI | OPC |
|---|---|---|---|---|---|
| 2-2-2 | 1 | SCP C | 10 | 5, 3, 2, 1 | SSP A |
| 2-2-2 | 1 | SCP D | 10 | 5, 3, 2, 1 | SSP A |
| 3-3-3 | 2 | SCP E | 10 | 3 | SSP B |
| 3-3-3 | 2 | SCP F | 10 | 3 | SSP B |
| 3-3-3 | 2 | SCP G | 20 | 3 | SSP B |
| 4-4-4 | 3 | SCP H | 10 | 3 | *(wild card) |
| 4-4-4 | 3 | SCP I | 20 | 3 | *(wild card) |

Network management procedures are preferably performed on a group basis, rather than on an individual group member basis. For example, if messages are destined for 2-2-2, and SCP C's node becomes unavailable, the far end would not receive a TFP since all messages would be directed to SCP D. TFPs would only be generated when all the nodes in a group were not available. TFR generation would be based upon a configurable parameter for the entire group based upon the percent of available nodes. Both broadcast and response method TFP/TFR/TFA would be supported and would reflect the status of the CPC (i.e. group of destinations).

Option 2

In an alternate implementation, the STP may logically link the point codes within a group without using a CPC. The key difference between this option and Option 1 is that the far end nodes route to the destination point code rather than a CPC. The STP may perform a similar function as Option 1 but would not receive messages destined to a capability point code of an MTP load sharing group. The far end node would still send messages to an actual destination but the DPC in the message may be translated to another group member's DPC and the message may be sent to a different destination.

TABLE 3

MTP Load Sharing Groups without CPCs

| Group ID | Point Code | Relative Cost | SI | OPC |
|---|---|---|---|---|
| 1 | SCP C | 10 | 5, 3, 2, 1 | SSP A |
| 1 | SCP D | 10 | 5, 3, 2, 1 | SSP A |
| 2 | SCP E | 10 | 3 | SSP B |
| 2 | SCP F | 10 | 3 | SSP B |
| 2 | SCP G | 20 | 3 | SSP B |
| 3 | SCP H | 10 | 3 | *(wild card) |
| 3 | SCP I | 20 | 3 | *(wild card) |

In performing network management for Option 2, the STP may generate TFP/TFR/TFA based upon the status of the Group ID instead of the CPC.

Figure 5:
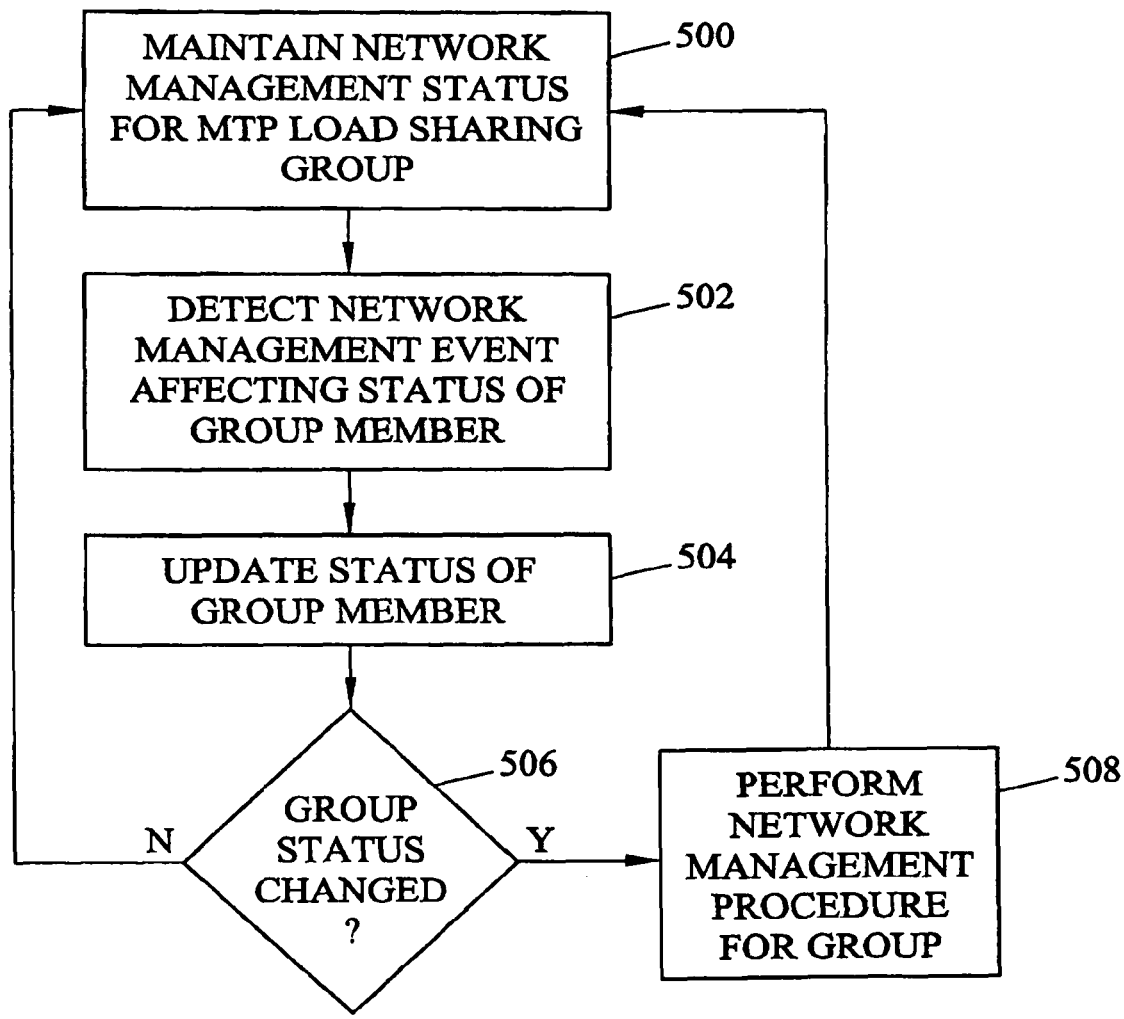
FIG. 5 is a flow chart illustrating exemplary steps for performing network management in an MTP load sharing environment according to an embodiment of the of the subject matter described herein.

FIG. 5 is a flow chart illustrating exemplary steps that may be performed by an STP in performing network management in an MTP load sharing group environment. Referring to FIG. 5, in step 500, the STP maintains network management status for an MTP load sharing group. For example, the STP may maintain route status information for all routes in the MTP load sharing group based on network management messages received from individual group members. In step 502, the STP detects a network management event affecting the status of a group member. An example of such an event may be the receipt of a TFP, a TFA, a TFR or a TFC message from one group member indicating that the route to the group member has become prohibited, restricted, allowed or congested. In step 504, the STP updates the status of the group member by storing the appropriate values in the sub-entry for the group member in the MTP load sharing group table. In step 506, the STP determines whether the group status has changed. If the group status has not changed, steps 500-506 are continuously repeated. If the group status has changed, the STP performs the appropriate network management procedure for the group. For example, if the entire group becomes prohibited, the STP may send a TFP to a node that sends a message to one of the group members. Similarly, if all group members are congested, the STP may send a TFC message to nodes that send messages to the group. TFR messages may be sent based on the percentage of available nodes in a group. TFA messages may be sent when all members of a group that were previously prohibited become available.

Although the examples described above relate primarily to load sharing MTP-routed messages among SCPs using MTP load sharing groups, the subject matter described herein is not limited to load sharing MTP-routed messages destined for SCPs. The methods and systems described herein may be used to load share any type of signaling messages marked route-on-PC-SSN addressed to any type of destination. For example, the methods and systems described herein may be used to load share ISUP messages marked route-on-PC-SSN among SSPs or media gateways. Load sharing any type of signaling messages that are marked route-on-PC-SSN is intended to be within the scope of the subject matter described herein.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for message transfer part (MTP) load sharing SS7 signaling message traffic in a telecommunications network, the method comprising:

at a network routing node:
 (a) receiving a signaling message addressed to a first destination point code;
 (b) determining whether a routing label in the signaling message indicates route-on-point-code-subsystem number; and
 (c) in response to determining that the routing label indicates route-on-point-code-subsystem-number:
  (i) determining, by performing a lookup using the first destination point code, whether the first destination point code is associated with an MTP level 3 load sharing group including a plurality of different SS7 point codes associated with a plurality of different destinations;
  (ii) in response to determining that the first destination point code is associated with an MTP level 3 load sharing group, selecting, based on relative load sharing weights assigned to the point codes, one of the point codes in the MTP level 3 load sharing group as a second destination point code for the signaling message, and
  (iii) routing the signaling message using the second destination point code.

2. The method of claim 1 wherein receiving a signaling message includes receiving a signaling connection control part (SCCP) message.

3. The method of claim 1 wherein receiving a signaling message includes receiving an ISDN user part (ISUP) message.

4. The method of claim 1 wherein receiving a signaling message includes receiving an Internet Engineering Task Force (IETF) SIGTRAN protocol signaling message.

5. The method of claim 1 wherein receiving a signaling message includes receiving a signaling message that has undergone a final global title translation.

6. The method of claim 1 wherein receiving a signaling message includes receiving a signaling message at a network routing node.

7. The method of claim 1 wherein receiving a signaling message includes receiving a signaling message sent route-on-point-code-subsystem-number.

8. The method of claim 1 wherein the MTP level 3 load sharing group comprises a group of destination point codes associated with the same application.

9. The method of claim 1 wherein routing the message using the second destination point code includes replacing the first destination point code in the message with the second destination point code.

10. A method for load sharing packet telephony signaling messages, the method comprising:
at a network routing node:
(a) receiving a packet telephony signaling message;
(b) determining whether the packet telephony signaling message includes a destination point code associated with a packet telephony load sharing group including a plurality of different packet telephony destinations, at least some of which correspond to different SS7 point codes, wherein determining whether the packet telephony signaling message includes a destination point code associated with a packet telephony load sharing group includes performing a lookup using the destination point code in the packet telephony signaling message;
(c) in response to determining that the packet telephony signaling message includes a destination point code associated with a packet telephony load sharing group, selecting one of the packet telephony destinations in the packet telephony load sharing group based on relative load sharing weights assigned to the packet telephony destinations; and
(d) routing the packet telephony signaling message to the selected packet telephony destination using the SS7 point code assigned to the packet telephony destination as a destination point code for the packet telephony signaling message.

11. A system for load sharing signaling message traffic in a telecommunications network, the system comprising:
(a) a link interface module for sending and receiving signaling messages;
(b) a message transfer part (MTP) load sharing group data structure associated with the link interface module for associating different MTP level 3 network addresses with MTP level 3 load sharing groups;
(c) a discrimination function for identifying signaling messages having routing indicators indicating route-on-point-code-subsystem-number; and
(d) a routing function operatively associated with the link interface module and the load sharing group data structure for receiving the signaling messages having a routing indicator indicating route-on-point-code-subsystem number, for extracting an MTP level 3 destination point code from a received signaling message having a routing indicator indicating route-on-point-code-subsystem-number, for accessing the load sharing group data structure using the extracted MTP level 3 destination point code, identifying an MTP level 3 load sharing group corresponding to the level 3 destination point code and routing the signaling message to a destination in the MTP level 3 load sharing group, wherein at least one of the MTP level 3 load sharing groups includes a plurality of members being assigned different relative load sharing weights, and wherein the routing function is configured to select one of the members based on the relative load sharing weights.

12. The system of claim 11 wherein the link interface module comprises an SS7 link interface module for sending and receiving SS7 signaling messages.

13. The system of claim 11 wherein the link interface module comprises a Sigtran link interface module for sending and receiving Sigtran signaling messages.

14. The system of claim 11 wherein the link interface module comprises an IP telephony link interface module for sending and receiving IP telephony signaling messages.

15. The system of claim 11 wherein the MTP load sharing group data structure is located on the link interface module.

16. The system of claim 11 wherein the MTP load sharing group data structure comprises an SS7 routing table for associating destination point codes in received signaling messages with the MTP load sharing groups.

17. The system of claim 16 wherein the routing function is configured to replace destination point codes in received signaling messages addressed to MTP load sharing groups with destination point codes extracted from the MTP load sharing group table.

18. The system of claim 11 wherein the load sharing group data structure defines load sharing groups for the signaling messages sent route-on-point-code-subsystem-number.

19. The system of claim 11 wherein the link interface module, the MTP load sharing group data structure, and the routing function are components of an SS7 signal transfer point.

20. The system of claim 11 wherein the link interface module, the MTP load sharing group data structure, and the routing function are components of an SS7/IP gateway.

21. A non-transitory computer readable medium having stored thereon computer executable instructions that when executed by a processor of a computer performs steps comprising:
(a) receiving a signaling message addressed to a first destination point code;
determining whether a routing label in the signaling message indicates route-on-point-code-subsystem number; and
(b) in response to determining that the routing label indicates route-on-point-code-subsystem-number:
(i) determining, by performing a lookup using the first destination point code, whether the first destination point code is associated with an MTP level 3 load sharing group including a plurality of different SS7 point codes associated with a plurality of different destinations;
(ii) in response to determining that the first destination point code is associated with an MTP level 3 load sharing group, selecting, based on relative load sharing weights assigned to the point codes, one of the point codes in the MTP level 3 load sharing group as a second destination point code for the signaling message, and
(iii) routing the signaling message using the second destination point code.

22. The non-transitory computer readable medium of claim 21 wherein receiving a signaling message includes receiving a signaling connection control part (SCCP) message.

23. The non-transitory computer readable medium of claim 21 wherein receiving a signaling message includes receiving an ISDN user part (ISUP) message.

24. The non-transitory computer readable medium of claim 21 wherein receiving a signaling message includes receiving an Internet Engineering Task Force (IETF) SIGTRAN protocol signaling message.

25. The non-transitory computer readable medium of claim 21 wherein receiving a signaling message includes receiving a signaling message that has undergone a final global title translation.

26. The non-transitory computer readable medium of claim 21 wherein receiving a signaling message includes receiving a signaling message at a network routing node.

27. The non-transitory computer readable medium of claim 21 wherein receiving a signaling message includes receiving a signaling message sent route-on-point-code-subsystem-number.

28. The non-transitory computer readable medium of claim 21 wherein the MTP level 3 load sharing group comprises a group of destination point codes associated with the same application.

29. The non-transitory computer readable medium of claim 21 wherein routing the message using the second destination point code includes replacing the first destination point code in the message with the second destination point code.

30. A non-transitory computer readable medium having stored thereon computer executable instructions that when executed by a processor of a computer performs steps comprising:
   (a) receiving a packet telephony signaling message;
   (b) determining whether the packet telephony signaling message includes a destination point code associated with a packet telephony load sharing group including a plurality of different packet telephony destinations, at least some of which correspond to different SS7 point codes, wherein determining whether the packet telephony signaling message includes a destination point code associated with a packet telephony load sharing group includes performing a lookup using the destination point code in the packet telephony signaling message;
   (c) in response to determining that the packet telephony signaling message is includes a destination point code associated with a packet telephony load sharing group, selecting one of the packet telephony destinations in the packet telephony load sharing group based on relative load sharing weights assigned to the packet telephony destinations; and
   (d) routing the packet telephony signaling message to the selected packet telephony destination using the SS7 point code assigned to the packet telephony destination as a destination point code for the packet telephony signaling message.

* * * * *